(12) United States Patent
Lin (10) Patent No.: US 9,990,299 B2
(45) Date of Patent: Jun. 5, 2018

(54) CACHE SYSTEM AND METHOD

(71) Applicant: Shanghai XinHao Micro Electronics Co. Ltd., Shanghai (CN)

(72) Inventor: Kenneth Chenghao Lin, Shanghai (CN)

(73) Assignee: SHANGHAI XINHAO MICROELECTRONICS CO. LTD., Shanghai (CN)

( * ) Notice: Subject to any disclaimer, the term of this patent is extended or adjusted under 35 U.S.C. 154(b) by 67 days.

(21) Appl. No.: 15/102,116

(22) PCT Filed: Dec. 5, 2014

(86) PCT No.: PCT/CN2014/093150
§ 371 (c)(1),
(2) Date: Jun. 6, 2016

(87) PCT Pub. No.: WO2015/081889
PCT Pub. Date: Jun. 11, 2015

(65) Prior Publication Data
US 2016/0306745 A1    Oct. 20, 2016

(30) Foreign Application Priority Data

Dec. 6, 2013 (CN) .......................... 2013 1 0681833

(51) Int. Cl.
*G06F 12/08* (2016.01)
*G06F 12/0868* (2016.01)
(Continued)

(52) U.S. Cl.
CPC .......... *G06F 12/0868* (2013.01); *G06F 9/383* (2013.01); *G06F 12/0862* (2013.01);
(Continued)

(58) Field of Classification Search
None
See application file for complete search history.

(56) References Cited

U.S. PATENT DOCUMENTS 4,942,521 A     7/1990  Hanawa et al.
5,043,870 A *   8/1991  Ditzel ....................... G06F 9/34
                                                          711/110
(Continued)

FOREIGN PATENT DOCUMENTS

CN    1334512 A    2/2002
CN    1619511 A    5/2005
CN    1963789 A    5/2009

OTHER PUBLICATIONS

The World Intellectual Property Organization (WIPO) International Search Report for PCT/CN2014/093150 dated Mar. 9, 2015.

*Primary Examiner* — Mano Padmanabhan
*Assistant Examiner* — Jean C Edouard
(74) *Attorney, Agent, or Firm* — Anova Law Group, PLLC (57) ABSTRACT

This invention provides a cache system and method based on instruction read buffer (IRB). When applied to the field of processor, it is capable of filling instructions to the instruction read buffer which can be directly accessed by processor core and the processor core outputs instruction to the processor core for execution autonomously and achieve a high cache hit rate.

24 Claims, 4 Drawing Sheets

(51) Int. Cl.
*G06F 9/38* (2018.01)
*G06F 12/0862* (2016.01)
*G06F 12/0895* (2016.01)

(52) U.S. Cl.
CPC .. *G06F 12/0895* (2013.01); *G06F 2212/1021* (2013.01); *G06F 2212/281* (2013.01); *G06F 2212/282* (2013.01); *G06F 2212/451* (2013.01)

(56) References Cited

U.S. PATENT DOCUMENTS

| | | | |
|---|---|---|---|
| 6,101,580 A * | 8/2000 | Agesen | G06F 9/5016 707/999.202 |
| 2002/0099765 A1 * | 7/2002 | Otis | G06F 12/0276 709/203 |
| 2003/0037178 A1 * | 2/2003 | Vessey | G06F 9/54 719/319 |
| 2004/0148468 A1 * | 7/2004 | Hooker | G06F 9/30043 711/132 |
| 2004/0162947 A1 * | 8/2004 | Hooker | G06F 9/3004 711/132 |
| 2005/0138263 A1 | 6/2005 | McKeen | |
| 2006/0026354 A1 * | 2/2006 | Lesot | G06F 9/30174 711/118 |
| 2006/0294320 A1 * | 12/2006 | Yallapragada, Sr. | G06F 12/109 711/147 |
| 2008/0028195 A1 * | 1/2008 | Kissell | G06F 8/441 712/228 |
| 2009/0235102 A1 * | 9/2009 | Koshika | G03G 15/5004 713/324 |
| 2011/0264870 A1 * | 10/2011 | Ylonen | G06F 12/0261 711/154 |
| 2012/0042146 A1 * | 2/2012 | Gandhi | G06F 3/0611 711/165 |
| 2014/0297961 A1 * | 10/2014 | Thottethodi | G06F 12/0875 711/132 |

\* cited by examiner

Figure 11

US 9,990,299 B2

CACHE SYSTEM AND METHOD

CROSS-REFERENCES TO RELATED APPLICATIONS

The application is the U.S. National Stage of International Patent Application No. PCT/CN2014/093150, filed on Dec. 5, 2014, which claims priority of Chinese Application No. 201310681833.4 filed on Dec. 6, 2013, the entire contents of which are hereby incorporated by reference.

FIELD OF THE INVENTION

The present invention generally relates to the fields of computer, communication and integrated circuit.

BACKGROUND

In general, the role of data cache is to copy a portion of data contents from a lower level memory into itself, to enable these contents to be accessed faster by a higher level memory or processor core, to ensure the continuous operation of the pipeline. The current high performance computer/microprocessor, etc. uses independent data cache to avoid the Von Neumann bottleneck: instruction and data using the same channel. With the extensive application of multi-instruction issue, singular data cache has often become the bottleneck to restrict processor function improvement.

In the existing technology, data cache system is comprised of data memory and tag memory. Data memory and tag memory correspond row-to-row. Data memory stores data; tag memory stores tags of data addresses, that is, the higher bits of data addresses. The addressing of the current data cache is based on the following: use the index in the address to find the tag stored in that index from the tag memory and match it with the tag portion in the address; use the index in the address and the shift amount in the block to find and read out the content in the cache. In the existing technology, the adjacent memory rows have the contiguous index addresses, but the tags stored in the adjacent rows in the tag memory can be non-contiguous. From the compiler's point of view, the target program is running in its own logic address space, every program value has its own address in this address space. A target program in the logical address space of the run-time image contains the data region and code region. Data region usually comprises of static region, heap region, unused memory, and stack region. Stack region stores the data structure for the record of activity, which are usually generated during the function calls. Usually the static region and the heap region grow from the bottom to top in the memory space, the stack grows from the top to bottom in the memory space. The two do not overlap, separated by unused memory region.

Usually the register resources within the processor are limited, during a procedure call it is often necessary to move the contents of the registers to memory. At the end of procedure call, any register used by the caller must be restored to hold the values it held before the procedure. The contents that were swapped out to memory are written back into register.

In the existing technology, the ideal data structure for swap out/write back to register is stack. Stack is a type of last in first out queue. Stack needs a pointer to point to the latest assigned address, indicating the memory location to store the register content which will be swapped out by the next procedure call, or the memory location of the register's old values. When data is stored into stack it is called stack push, when data is moved out of stack it is called stack pop. In accordance with the common practice, stack "grow" from high address to low address. This indicates that when stack push, stack pointer value decreases; and when stack pop, stack length decreases, stack pointer increases. In other words the addresses in stack are contiguous.

Because the addresses in stack are contiguous, and the tags stored in tag memory are not contiguous, therefore the cache goes through a lot of trouble when searching and replacing, and has become the most serious bottleneck that restricts modern processors.

The method and system apparatus disclosed in this invention can solve one or more problems above.

BRIEF SUMMARY OF THE DISCLOSURE

The disclosed methods and systems are directed to solve one or more problems set forth above and other problems.

This application discloses a method which divides the data address space. The division of data address space enables a plural number of data caches on the same memory hierarchy level to provide data to the processor in parallel, thus ease the data access bottleneck. Dividing the cache into: Stack Cache, used by the data that is stored into the stack region during the store-program runtime; and non-stack cache, used by other data that is stored during program runtime. When the data executed by processor core accesses the corresponding data located in the stack region, it directly accesses stack cache.

Optionally, based on the data access instruction's data address determine if the corresponding data is located within the stack region, or within the non-stack region; or based on the base address register number of the data access instruction determine if the corresponding data is located within the stack region, or within the non-stack region.

Optionally, the data addresses greater than or equal to the value of the stack register are located within the stack region.

Optionally, uses a memory space with contiguous address in the stack cache to store the data of contiguous memory address in the stack region of memory space.

Optionally, a circular buffer is used to implement the stack cache.

Optionally, it comprises: top-of-stack pointer, pointing to the data located at the top of the stack in the stack cache. Bottom-of-stack pointer, the bottom-of-stack pointer and top-of-stack pointer maintain a certain distance, and the data between the two is the effective data within the stack cache.

Optionally, when the top-of-stack value changes, the direction the top-of-stack pointer moves can be determined by subtracting the original top-of-stack pointer value and the new top-of-stack pointer value.

Optionally, a multi-layer stack cache is comprised of multiple said stack cache architectures; among: The top-of-stack pointer value of the highest level stack cache is determined by the top-of-stack value produced by the processor core. The top-of-stack pointer values of other level stack caches is determined by the bottom-of-stack pointer of the stack cache one level higher.

Optionally, the circular buffers of the stack caches of all levels form a big circular buffer, the circular buffer spans different cache levels.

Optionally, when the stack cache of a higher level is full or almost full, store at least one data the bottom-of-stack pointer points to into a lower level stack cache and the storage location of the valid data that has yet to be stored that neighbors the location of the top-of-stack pointer, and correspondingly move the bottom-of-stack pointer of the higher level stack cache and the top-of-stack pointer of the lower level stack cache.

Optionally, when the stack cache of a higher level is empty or almost empty, and there is data in a lower level stack cache, retrieve at least one data pointed to by the top-of-stack pointer of the lower level stack cache and store it into the location of valid data not yet stored that neighbor the bottom-of-stack pointer of the higher level stack cache, and correspondingly move the bottom-of-stack pointer of the higher level stack cache and the top-of-stack pointer of the lower level stack cache.

Optionally, a certain number of storage units in the stack cache are reserved as a reserved section. New data can be written into the reserved section of the stack cache, but the reserved section must be greater than or equal to the preset minimum capacity; the minimum capacity value is zero or positive. If the writing in of new data results in the reserved section becoming less than the minimum capacity, the bottom-of-stack pointer points to at least one data stored in a lower level stack cache and the storage location of valid data that has not yet been stored that neighbor the top-of-stack pointer location, and correspondingly move the bottom-of-stack pointer of the stack cache and the top-of-stack pointer of the lower level stack cache.

Optionally, when supporting the simultaneous execution of multiple threads, the number of the storage unit corresponding to the reserved section is stored in the reserve pool; If new data is written in, the reserve pool allocates a storage unit number to store the data; If there is data retrieved from the stack and the data is no longer stored there, the corresponding storage unit number is sent back to the reserve pool.

Optionally, when the top-of-stack pointer of a thread that is currently being executed by the stack, moves down and needs more storage blocks, and the reserve pool has no more reserved memory blocks, control other threads to move the bottom-of-stack pointer to release memory blocks for the thread top-of-stack pointer to use.

Optionally, every storage unit or every group of storage units has a corresponding data address; simultaneously match the data addresses and the data addresses sent by the processor core, a storage unit corresponding to the data address sent by the processor core can be found, or a group of storage units can find a corresponding storage unit in the current group of storage units.

Optionally, the top-of-stack value and the number of the corresponding storage unit or a group of storage units. Subtract the data address sent by the processor core with the top-of-stack value, and obtain the difference between the data address and the top-of-stack value; based on the difference and the contiguous address sequence, finds the corresponding memory cell or a corresponding memory cell from a set of memory cells from the stack cache.

This application disclose a cache system encompassing stack cache and non-stack cache; the stack cache only stores data that is in the stack region during program execution. When the data corresponding to the processor core's data access command is located in the stack region, directly access the stack cache.

Optionally, in the stack cache, the contiguous storage unit stores the data in the stack region.

Optionally, the stack cache is comprised of circular buffers.

Optionally, the stack cache also includes a top-of-stack register, used to store the location of the stack cache's top-of-stack value. And the bottom-of-stack pointer's corresponding location can be calculated based on the top-of-stack register value and the effective data quantity stored in the stack cache.

Optionally, wherein, also includes a subtractor, when the top-of-stack pointer value changes, the direction of movement of the top-of-stack pointer can be determined by using the subtractor to subtract the original top-of-stack pointer value and the new top-of-stack pointer value.

Optionally, multiple of the stack caches comprise a multi-level stack cache system; among: the top-of-stack pointer value of the highest level stack cache is determined by the top-of-stack value produced by the processor core; The top-of-stack pointer values of stack caches of other levels are determined by the bottom-of-stack pointer value of the stack cache one level higher.

Optionally, when a higher level stack cache is full or almost full, store at least one data that bottom-of-stack pointer points to, into an memory location that is not storing valid data next to the top-of-stack pointer location in the lower level stack cache, and move the bottom-of-stack pointer of the higher level stack cache and the top-of-stack pointer of the lower level stack cache accordingly.

Optionally, when the higher level stack cache is empty or near empty, and when a lower level stack cache has data, store the data the lower level stack cache's top-of-stack pointer points to, into a memory location that is not storing valid data next to the bottom-of-stack pointer of the higher level stack cache, and move the bottom-of-stack pointer of the higher level stack cache and the top-of-stack pointer of the lower level stack cache accordingly.

Optionally, multiple memory units are reserved as the reserved portion; The new data can be written into the stack cache's reserved portion, but must ensure that the reserved portion is greater than or equal to the defined minimum capacity; the minimum capacity value is zero or positive; If a new write-in results in the reserved portion becoming less than the defined minimum capacity, move at least one data that the bottom-of-stack pointer points to into a memory unit that is not storing valid data and neighbors the top-of-stack pointer in a lower level stack cache, and move the bottom-of-stack pointer of the stack cache and the top-of-stack pointer of the lower level stack cache accordingly.

Optionally, also includes a reserve pool; when supporting multiple threads executing in parallel, store the number of the storage unit corresponding to the reserved portion into the reserve pool. If there is a new data write-in, reserve pool assigns a storage unit number to store data. If there is data that is fetched from the stack and no longer stored, the corresponding memory unit number is sent back to the reserve pool.

Optionally, wherein, every memory unit or every group of memory units also includes: Address register, used to store the data address of a memory unit or a group of memory units; and Comparator, used to compare the data address of the address register with the data address sent by the processor core; Through the simultaneous matching of the comparator, the storage unit corresponding to the data address sent by the processor core can be found, or the storage unit corresponding to the group of memory cells can be found in the group of storage units.

Optionally, wherein, also includes: Top-of-stack register, used to record top-of-stack value; Top-of-stack pointer register, used to record the memory cell corresponding to the top-of-stack value or the number of a group of memory cells; and address subtract; used to subtract the data address sent by the processor core with the top-of-stack value, and obtain the difference between the data address and top-of-stack value; based on the difference and the contiguous address sequence, finds the corresponding memory cell or a corresponding memory cell from a set of memory cells from the stack cache.

BENEFITS OF THE INVENTION

The cache system and method disclosed is capable of providing the independent stack cache and non-stack cache to store separately the data of stack region or non-stack region. The disclosure increase the number of cache read/write ports, improve the cache throughput. It also reduces cache power dissipation.

DETAILED DESCRIPTION

Reference will now be made in detail to exemplary embodiments of the invention, which are illustrated in the accompanying drawings in connection with the exemplary embodiments. By referring to the description and claims, features and merits of the present invention will be clearer to understand. It should be noted that all the accompanying drawings use very simplified forms and use non-precise proportions, only for the purpose of conveniently and clearly explaining the embodiments of this disclosure.

It is noted that, in order to clearly illustrate the contents of the present disclosure, multiple embodiments are provided to further interpret different implementations of this disclosure, where the multiple embodiments are enumerated rather than listing all possible implementations. In addition, for the sake of simplicity, contents mentioned in the previous embodiments are often omitted in the following embodiments. Therefore, the contents that are not mentioned in the following embodiments can be referred to in the previous embodiments.

Although this disclosure may be expanded using various forms of modifications and alterations, the specification also lists a number of specific embodiments to explain in detail. It should be understood that the purpose of the inventor is not to limit the disclosure to the specific embodiments said herein. On the contrary, the purpose of the inventor is to protect all the improvements, equivalent conversions, and modifications based on spirit or scope defined by the claims in the disclosure. The same reference numbers may be used throughout the drawings to refer to the same or like parts.

Figure 1:
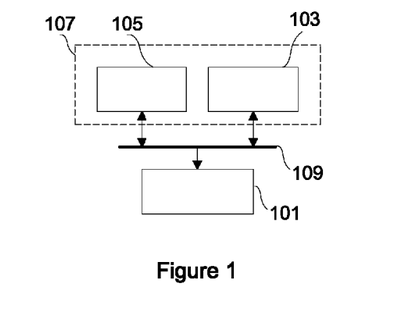
FIG. 1 illustrates an exemplary cache system environment consistent with the disclosed embodiments.

FIG. 1 illustrates an exemplary cache system environment consistent with the disclosed embodiments. As shown in FIG. 1, the cache system includes a CPU core 101 and cache 107. Cache 107 is comprised of stack cache 103 and non-stack cache 105, cache 107 is used to store the data used during execution. CPU core 101 can access data in the stack through stack cache 103; and access other data through non-stack cache 105. Stack cache 103 and non-stack cache 105 correspond to different address spaces, therefore data in stack cache 103 or non-stack cache 105 can be accessed directly by matching addresses.

In this invention, the data regions can be distinguished based on the data address, or the base register number in the data access instruction. That is, to distinguish if the data is in the stack region (stack cache 103) or in the non-stack region (non-stack cache 105), and access the data accordingly in the corresponding cache, to lower the power dissipation of memory access.

Specifically, the stack data usually has a larger address value (e.g. 0x7fffff0), and the address of non-stack data usually has a smaller address value (e.g. 0x404000cc). This way, stack data and non-stack data can be distinguished using the higher bits of the data address produced by the data access instruction.

Data address can normally be found by adding the value in a base address register specified by the data access instruction with an immediate value (or another base address register value), As for the data address in the stack, the corresponding base address register number is fixed (e.g. No. 29 register of MIPS instruction set). Therefore, the base address register number of the data access instruction can be used to determine if the data is in the stack region, or in the non-stack region.

In this embodiment, when CPU core 101 executes a data access instruction that reads data from memory or writes data into memory, data cache 107 is accessed first. At this time, the method of determining which region a data is in can be used, the data can be accessed in the corresponding cache region. If cache 107 has allocated space for this data, it is a cache hit, otherwise it is a cache miss. The following illustrates this embodiment with data load instructions. For store Instructions, the only difference is the data flow direction is opposite.

Specifically, if the address is in stack region, the CPU core 101 will send the data address to stack cache 103 to match. If match is successful, stack cache 103 outputs the corresponding data to CPU core 101 through bus 109. Similarly, if the address is in non-stack region, the CPU core 101 will send the data address to non-stack cache 105 to match addresses. If match is successful, non-stack cache 105 will output the corresponding data to CPU core 101 through bus 109. If match is unsuccessful, data in lower level storage should be filled into non-stack cache 105, and non-stack cache 105 will send the data to CPU core 101 to use.

Therefore, the present invention cache system provides a divided cache memory. It increases data throughput by adding cache read/write ports.

In this embodiment, assuming that the bottom of the stack address is greater than the top of the stack address. Stack push is achieved through decreasing the value of top-of-stack pointer to move the top-of-stack pointer, stack pop is achieved through increasing the value of the top-of-stack pointer to move the top-of-stack pointer. In the present disclosure, because the addresses in stack cache 103 are contiguous, therefore the stack cache 103 can be improved, making stack cache 103 able to allocate data addresses earlier. Before CPU core executes the data access instructions which access the stack region, stack cache 103 has already allocated the data memory corresponding to the data address of data access instruction, resulting in no cache misses in the data stack region.

Specifically, CPU core 101 produces all the addresses for data access. The CPU core sends to stack cache 103 all the data access requests which use the base address in the stack base address register, and all the data whose data access address are greater than or equal to the base address register value. The rest of the data access requests are sent to non-stack cache 105. Because the capacity of non-stack cache 105 and the capacity of stack-cache 103 are both smaller than cache 107, so hit-time and power consumption are all less than those of an undivided single cache with the same combined capacity Level 1 cache 107.

Figure 2:
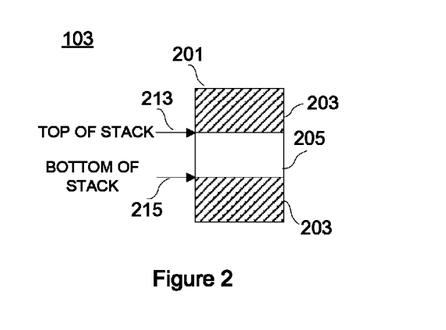
FIG. 2 illustrates an exemplary circular buffer stack consistent with the disclosed embodiments.

In this present invention, any suitable structure can be used to implement stack cache. FIG. 2 illustrates an exemplary circular buffer stack consistent with the disclosed embodiments. In this embodiment, stack cache 103 is comprised of a circular buffer 201. In this embodiment, circular buffer 201 is divided into two portions: data-occupied portion 203 and reserved portion 205. Further, set a minimum reserve capacity for reserve portion 205 (this minimum reserve capacity is greater than or equal to '0'). In addition, top-of-stack pointer 213 and bottom-of-stack pointer 215 point to boundaries of the two respective portions.

As shown in FIG. 2, data of the greater address is on the top of circular buffer 201, data of the lesser address is on the bottom of circular buffer 201. Initially, both top-of-stack pointer 213 and bottom-of-stack pointer 215 point to memory cell 203 on the bottom of circular buffer 201. When data is pushed (or data is written into stack), top-of-stack pointer gradually moves down until it points to the lowest memory cell in circular buffer 201. At this time, if there is still new data that needs to be stored in stack cache 103, by the nature of circular buffer, continued pushing of the stack will result in the top-of-stack pointer wrapping around to point to the memory cell in the upper most of circular buffer 201. Then, the continued pushing will make top-of-stack pointer 213 move down in the storage unit 204 in circular buffer 201 until the conditions are as shown in FIG. 2. At this time, the circular buffer area between top-of-stack pointer 213 and bottom-of-stack pointer 215 is-reserved portion 205, the bottom-of-stack pointer 215 goes along the stack push direction and wraps around to top-of-stack 213 are the memory space occupied by stack data.

At this time, if stack continues to pushes resulting in top-of-stack pointer (TOS pointer) 213 gradually moves down until the TOS pointer overlaps with Bottom-of-stack pointer (BOS hereafter); at this time, the stack is overflowed. If stack continues to pop, the TOS pointer will gradually move up. It will push to the highest memory cell in circular buffer 201 and continue to, and continue to push after wrapping around circular buffer's bottom portion, until it overlaps with BOS pointer 215. At this time, the stack is underflowed. These two situations must be avoided.

There must be an appropriate distance maintained between TOS pointer 213 and BOS 215 in both directions. A concept of minimum reserved distance should be defined. When TOS pointer 213 moves down during stack push so its distance to BOS pointer reaches the minimum reserve distance, then BOS pointer 215 also begins to move downwards, so the distance between BOS pointer 215 and TOS pointer 213 is maintained as greater than or equal to the minimum reserve distance. When BOS pointer moves down, the data in the stacks that are passed by the movement of the BOS will be moved to and stored in a lower level cache. In addition, define a minimum stack distance, TOS pointer 213 moves up due to stack popping, when the distance between TOS pointer 213 and BOS pointer 215 reaches the minimum stack distance, and when the cache one level lower also stores data that has not yet been moved to cache of this level, then the BOS pointer 215 also begins to move up, and so maintains a distance from TOS pointer 213 greater than or equal to the minimum reserve distance. When BOS pointer 215 moves up, the data that was stored in cache one level lower is moved back to the corresponding cells of the circular buffer 201 which have been passed by the movement of BOS pointer 215. Here, the lower level memory can be the main memory, or be normal cache, or can also be this invention's said stack cache.

Because in stack cache data address is contiguous, the address corresponding to data fetched from lower level stack cache and stored into higher level stack cache (or stored from higher level stack cache to lower level stack cache) is the contiguous data address greater than the data address pointed to by the BOS pointer. Therefore, by recording only the data address that is pointed to by the TOS pointer (or BOS pointer) of the highest level stack cache, and based on each level of stack cache's data capacity (that is, the greatest capacity that can be occupied by data) determine the data addresses pointed to by each level of stack caches' TOS pointer and BOS pointer.

Figure 3A:
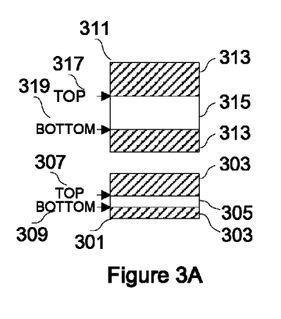
FIG. 3A illustrates the state of a two levels stack cache at a certain time consistent with the disclosed embodiments.

FIG. 3 illustrates a diagram of an exemplary 2 level cache system consistent with the disclosed embodiments. FIG. 3A illustrates the state of a two levels stack cache at a certain time. Data has been stored in all portions of Level one stack cache 301 (the data occupied portion 303) apart from the data reserve portion 305 (size equal to minimum reserve distance). The capacity of the reserved portion 315 of second level stack cache 311 is greater than its own minimum reserve distance (minimum reserved capacity 315' can be unequal to the minimum reserved capacity 305).

In this embodiment, the relationship between the data addresses of the 2 level stack cache is: TOS pointer 307 points to the data with the smallest data addressing stack cache 301, while BOS pointer 309 points to the data with the greatest data addressing stack cache 301; TOS pointer 317 points to the data with the smallest data address in stack cache 311, while BOS pointer 319 points to the data with the greatest data addressing stack cache 311. The addresses of all the data in stack cache 301 are less than the addresses of the data in stack cache 311. And the address of the data which is pointed to by BOS pointer 309 is less than the address of the data which is pointed to by TOS pointer 317 and the two are contiguous. This is equivalent to using two smaller circular buffers to implement a larger circular buffer with a capacity the sum of the two smaller circular buffers. That is, in function it implements a circular buffer that spans different cache levels.

Figure 3B:
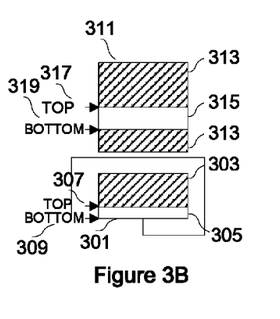
FIG. 3B illustrates stack push starting from the state of FIG. 3A.

FIG. 3B illustrates stack push starting from the state of FIG. 3A. Here, because new data is pushed into stack, the TOS pointer 307 of first level stack cache 301 moves down. To maintain reserved portion 305 as at least equal to the defined minimum capacity, BOS pointer 309 also moves down, and stores the data in the memory space it passes to the reserved portion 315 in second level stack cache 311, the reserved portion has a smaller address than TOS pointer 317, and the TOS pointer 317 of second level stack cache 311 moves down accordingly. Now, push stack operation is completed, and the data address relationship between the two levels of stack cache remains unchanged.

Figure 3C:
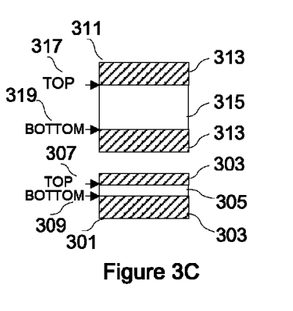
FIG. 3C illustrate stack pop starting from the state of FIG. 3A.

It should be noted that in the embodiment of FIG. 3, when the data in stack cache 301 is stored into second level stack cache 311, the data reserve portion 315 of second level stack cache 311 is always larger than the minimum reserve capacity. If data reserve portion 315 is smaller than the minimum reserve capacity, certain data in second level stack is be moved into lower level cache by the same method.

In addition, this embodiment shows that TOS pointer 307 in first level stack cache 301 points to stack region's TOS value, and BOS pointer 309 only points to the data with the greatest address in first level stack cache 301. Because the data of first level stack cache 301 have been moved to second level stack cache 311, and second level stack cache is not yet full, therefore at this time, the stack region's BOS value is pointed to by second level stack cache 311's BOS pointer 319. This same method can be applied to multi-level stack caches.

FIG. 3C illustrates the stack popping starting from the state in FIG. 3A. Because data is retrieved from cache, first level cache 301's TOS pointer 307 moves up, resulting in the capacity of the reserved portion 305 to increase over the requirement of the reserved portion, BOS pointer 309 moves up accordingly, fetching the data pointed to by the TOS pointer 317 in second level stack cache 311 (stack cache 311 performs pop stack operation) and stores into first level stack cache 301 in the reserved portion 305 which has greater addresses than that of BOS pointer 309. In this way, the capacity of reserved portion 305 is kept at the reserve capacity, but the data that has been stored into the smallest address in second level stack cache 311 is fetched back and stored to first level stack cache 301. Now, pop stack operation is completed, and the data address relationship between the two levels of stack cache remains unchanged.

It should be noted that when the reserved part 315 of the second level stack cache 311 is larger than the preset minimum capacity, if there is data stored in lower level stack cache, the corresponding data can be retrieved from the lower level stack cache and written to the corresponding position of the reserved part 315 of second level stack cache 311, and then move the bottom-of-stack pointer 319, the process is identical to the process of the embodiment in FIG. 3C.

To illustrate data movement between the stacks of two different cache levels, FIG. 3C illustrates that when top-of-stack pointer 307 of the first level cache moves upward (pop), the bottom-of-stack pointer 309 correspondingly moves upward, leading to data transferring from the second level cache to first level cache. In the actual operation, the bottom-of-stack pointer 309 may be defined as not moving upward following the top-of-stack pointer 307, but rather wait until the top-of-stack pointer 307 moves up so its distance to the bottom-of-stack pointer 309 reaches the minimum stack distance, and when second level cache also stores data which are not yet moved to first level cache. At this time, bottom-of-stack pointer 309 moves upward and transfers data from second level cache to first level cache. This method can avoid cache thrashing.

Based on present invention, stack cache can be further partitioned into blocks, so that data can be transferred between different levels of stack cache in blocks in order to simplify hardware complexity and to reduce frequency of data transfer between different levels of stack cache.

Figure 4A:
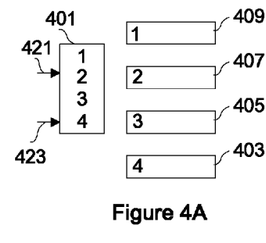
FIG. 4A illustrates an exemplary diagram of a block stack cache consistent with this disclosure.

FIG. 4 illustrates an exemplary stack cache partitioned in blocks consistent with the disclosed embodiments. The first level of stack cache is used as sample in this embodiment, for other levels of stack cache, the same technology may be applied. As is shown in FIG. 4A, stack cache 103 is divided into 4 blocks of equal size, i.e. memory blocks 403, 405, 407 and 409. As the previous embodiment shows, stack cache 103 is divided into a portion occupied by data and a reserved portion, and the minimum capacity of the reserved portion is equal to a block size.

Memory 401 records the usage of the present memory block in stack cache 103. For example, memory 401 can contain the same number of rows as number of blocks, each row records a block number. The above-mentioned rows records the block number of the memory blocks which have continuous in order data address (for example, from the bottom to the top). And the fourth row (the last row) records the number of the memory block which contains the top of the stack pointer 423. The second row records the number of the memory blocks, which contains the bottom of the stack pointer 421. Accordingly, the first row records the number of the memory block which was the reserved portion. As FIG. 4A shows, the number of the memory block that is recorded in the fourth row of the memory 401 is '4', it means that the top of the stack pointer 423 is pointing to a memory cell in the memory block 403; the number of the memory block which was recorded in the third row is '3', which means the data address recorded in memory block 405 was continuous to the data address recorded in memory block 403 and is also bigger than the address in memory block 403. The number of the memory block recorded in the second row is '2', which means the top of the stack pointer 421 is currently pointing to a memory cell in the memory block 407. The memory block number recorded in the first row of memory block 401 is '1', which means that the memory block 409 is the reserved portion.

In the present embodiment, when carrying out the push operation, if the memory block 403 is not full (the pointer to the top of the stack has not been pointed to the memory cell of the smallest address), the new data is directly stored into the memory cell in memory block 403, whose address is smaller than the top-of-stack pointer 423, and then moves down the top-of-stack pointer 423 in memory block 403. If the memory block 403 is full, new data should be stored in the reserved portion (i.e. memory block 409), so that memory block 409 is no longer a reserved part. At the same time, data from memory block 407 should be transferred to lower level stack cache or memory, to keep the size of reserved portion not changed.

Figure 4B:
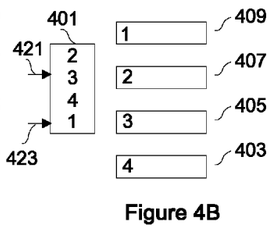
FIG. 4B illustrates an exemplary stack pushing starting form states in FIG. 4A.

FIG. 4B it illustrates pushing data to memory block 409 starting form states in FIG. 4A. When data is stored to memory block 409, top-of-stack pointer 423 is moved pointing to the corresponding memory cell in memory block 409. At this time, memory block 409 becomes the memory block which the top-of-stack pointer 423 points to, so the fourth row in memory block 401 records the number of memory block 409 (i.e. '1'). At the same time, bottom-of-stack pointer 421 points to memory block 405, so that the second row of memory block 401 should record the number of memory block 405 (i.e. '3'). Data in memory block 407 should be stored to a lower level stack cache or memory, making memory block 407 the new reserved portion. By updating block number recorded in each row of memory 401, every row still records the number of memory blocks in order whose data address is continuous.

Figure 4C:
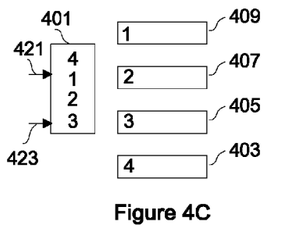
FIG. 4C illustrates an stack popping starting form states in FIG. 4A.

Go back to the state of FIG. 4A. When carrying out the pop operation, if memory block 403 is not empty (top-of-stack pointer 423 doesn't point to the maximum address of memory cell in memory block 403), directly fetch data from memory block 403, which top-of-stack pointer points to, then move the top-of-stack pointer 423 upwards in memory block 403. If memory block 403 is empty, top-of-stack pointer 423 has already pointed to memory block 405. Therefore memory blocks 409 and 403 are both reserved portions. If data has been transferred to lower level stack cache or memory before, fetching a data block is fetched from lower level stack cache or memory and store it into memory block 409, so that data address in memory block 409 is the maximum in stack cache 103, making bottom-of-stack pointer 421 point to memory block 409, and memory block 403 is the reserved portion. FIG. 4C illustrates block numbers recorded in every row in memory 401. By now, the number of the memory block recorded in fourth row is '3', which means memory block 405 is pointed by top-of-stack pointer 423; the number of block recorded in third row is '2', which means data address in memory block 407 is continuous to that of memory block 405's, greater than data address in memory block 405's as well; the number of block recorded in second row is '1', which means memory block 409 is pointed to by bottom-of-stack pointer 421; the number of block recorded in first row is '4', which means memory block 403 is reserved portion.

Figure 5:
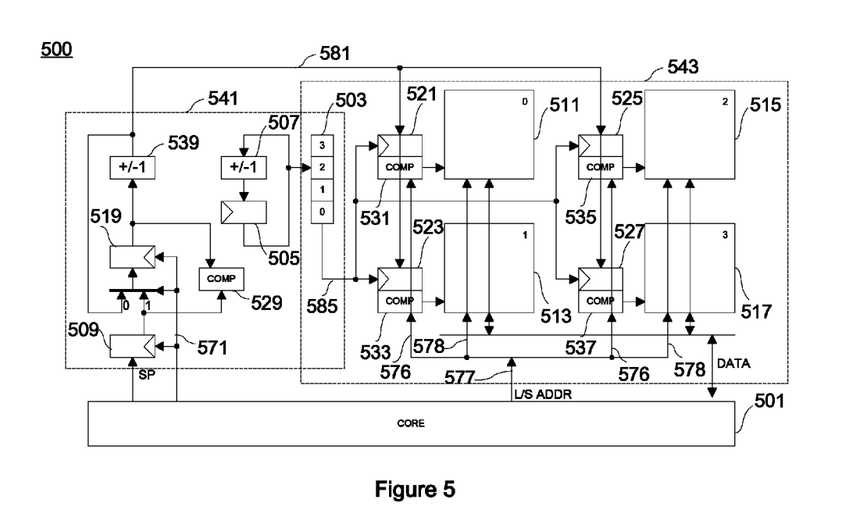
FIG. 5 illustrates an exemplary blocked stack cache consistent with the disclosed embodiments.

FIG. 5 illustrates an exemplary blocked stack cache consistent with the disclosed embodiments. Take stack cache divided into 4 memory blocks as example, other dividing can be deduced by the same method. The stack cache can be divided in two functional parts, one is circular buffer maintenance section 541, and the other is data read/write section 543. Components used by circular buffer maintenance section 541 include memory 503, top-of-stack pointer 505, incrementor-/decrementer 507, register 509, register 519, comparator 529 and incrementor-/decrementer 539. Components used by read/write section 543 include memory 503, memory block 511, 513, 515, 517, block address register 521, 523, 525, 527, and comparator 531, 533, 535, 537. Among them, memory 503 is used by both sections. Additionally, to make the figure easier to read, bottom-of-stack pointer and controller are not included in FIG. 5 and the following figures.

In this and later embodiments, top-of-stack pointer in highest level stack will be set by processor Core, and bottom-of-stack pointer of the highest level stack follows the top-of-stack pointer, i.e. when the distance between top-of-stack pointer and bottom-of-stack pointer are less than the minimum reserve distance, bottom-of-stack pointer moves downward to maintain the minimum reserve distance; when distance between top-of-stack pointer and bottom-of-stack pointer is less than the minimum stack distance and there is data in the lower level cache which hasn't been fetched back to higher level cache, bottom-of-stack pointer moves upward to maintain minimum stack distance. The movement of bottom-of-stack pointer of the higher level cache controls the movement of top-of-stack pointer of the lower level cache, in turn controls data's transfer between higher level cache and lower level cache as well. When bottom-of-stack pointer of higher level cache moves downwards, data will be transferred from a higher level cache to a lower level cache; when bottom-of-stack pointer of higher level cache moves upward, data will be transferred from lower level cache to higher level cache. Though not displayed in every figure, bottom-of-stack pointer moves in the manner as said here.

In the present embodiment, for every memory block, there is one block address register for recording the starting data address of the block, one block address comparator for comparing data address 577 from processor core 501 to data address in block address register. For example, memory blocks 511, 513, 515 and 517 correspond to block numbers '0', '1', '2' and '3", and corresponding to block address register 521, 523, 525, 527, and corresponding to block address comparator 531, 533, 535, 537.

Memory 503's function and structure are the same as those of memory 401's in FIG. 4, it records the block numbers of memory blocks in the order of stack address. Top-of-stack register 505 stores the position in memory 503 of the block number corresponding to top-of-stack pointer. That is, the content of 503 indexed by the output of top-of-stack pointer 505 may be read out. This content is the memory block number of the block which contains the memory cell pointed by the top-of-stack pointer.

Stored in register 509 is the data address that corresponds to present top-of-stack (called present TOS value for simplicity, i.e. top-of-stack value). Register 519 stores the previous TOS value, which eventually is updated to present TOS value. Specifically, once top-of-stack changes, when value of stack registers in processor core 501 are updated (such like when register 29 in MIPS instruction set is written), this value is also written in to register 509 at the same time under the control of top-of-stack update signal 571 whose value is '1' at this time. At the same time, signal 571 whose value is '1' controls selector 573 to select the previous TOS value outputted by register 509, and write this value to register 519. Then, comparator 529 compares register 509's value to register 519's value, judging whether they are in the same memory block, and if not, and the direction of movement of top-of-stack pointer. After signal 571 becomes '0', it controls selector 573 to take output of incrementor-/decrementer 539 as input of register 519.

If top-of-stack pointer moves downward (that is pushing stack, TOS value becomes smaller), value of register 519 is decreased by '1' (size of one memory block) by incrementor-/decrementer 539 every clock cycle, then the value will write back to register 519 through bus 581, until TOS value in register 519 and TOS value in register 509 are in the same memory block. During this process, on each subtraction, incrementor-/decrementer 507 subtracts '1' from top-of-stack register 505 synchronously, so that top-of-stack pointer stored in top-of-stack register 505 points to a lower position to memory 503. Read the block number from this position of memory 503 and use this block number through bus 585 and selecting the block address register of the corresponding memory block. Then write the value on bus 581 to the selected block address register. Thus, at the end, the top-of-stack pointer in top of the stack register 505 points to a memory cell in memory 503. The content of this memory cell is the memory block number which corresponds to the TOS value in register 509. And each of the block address registers of each memory block corresponds to the moving top-of-stack pointer are updated.

Similarly, If top-of-stack pointer moves upward (that is popping stack, TOS value becomes greater), value of register 519 is increased by '1' (size of one memory block) by incrementor-/decrementer 539 every clock cycle, then the value will write back to register 519 through bus 581, until TOS value in register 519 and TOS value in register 509 are in the same memory block. During this process, on each addition, incrementor-/decrementer 507 address '1' to top-of-stack register 505 synchronously, so that top-of-stack pointer stored in top-of-stack register 505 points to a higher position to memory 503. Read the block number from this position of memory 503 and use this block number through bus 585 and selecting the block address register of the corresponding memory block. Then write the value on bus 581 to the selected block address register. Thus, at the end, the top-of-stack pointer in top of the stack register 505 points to a memory cell in memory 503. The content of this memory cell is the memory block number which corresponds to the TOS value in register 509.

Figure 6:
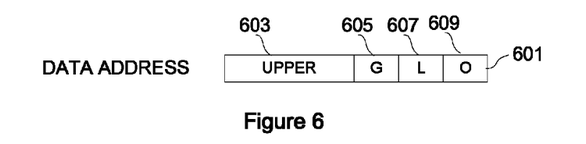
FIG. 6 illustrates an exemplary address format consistent with the disclosed embodiments.

Further, in the embodiment of this case, each data stored in each memory block could be aligned by address boundary, i.e. all lower bits of the lowest data address in each memory block are all '0's, so we only need to store the higher bits of a data address in the corresponding block address register as well as in register 509 and 519. Similarly, comparator 529 only needs to compare the higher bits of the address. FIG. 6 illustrates an exemplary address format consistent with the disclosed embodiments.

In this embodiment, data address 601 is divided into four parts: high address 603, block number 605, line number 607, and offset address 609. The value on bus 576 in the embodiment of FIG. 5 is exactly the high address 603 and the block number 605, and the value on bus 578 is exactly the line number 607 and the offset address 609. In this way, every block address register, register 509 and register 519 stores the high address 603 and block number 605 described above, and the block number 605 equals the block number associated with this memory block.

Specifically, the high address 603 is the same as the higher part of the TOS value. The start address of the block, which is pointed by TOS pointer, could be obtained by filling '0's to the lower part of such address in 603. In this way, compare the higher part of data address 577 sent by processor 501 on bus 576 with the high addresses stored in the block address register of every valid memory block (i.e. every block between the TOS pointer and the BOS pointer). If an equal is found then the data corresponding to address 577 is stored in the memory block, which corresponds to the 'equal' block address register. Specifically, a valid bit can be added to the address register to mark whether the memory block stores valid data. In addition, block number 605 represents the memory block number, and line number 607 represents the memory line in each block while offset address 609 represents the memory cell (i.e. data) on each memory line. In this way, the line number 607 and the offset address 609 in data address 577 on bus 578 addresses a data location in a memory block which has a 'equal' value to the higher address part 603 and block number 605 on bus 576.

Back to the FIG. 5, assume that each memory block contains 8 storage lines and each storage line contains 8 memory cells (i.e. 8 units of data). So in data address 601, line number 607 and offset address 609 each occupy 3 bits. Also, assuming the present TOS value is "FDE6" in hexadecimal address (i.e. high address 603 as hexadecimal "FD", block number 605 as binary "11", line number 607 as binary "100", and offset address 609 as binary "110") suggests that the present TOS pointer points to the number "6" memory cell of the number "4" memory line of the number "3" memory block 517. In other words, we can use the block number value of a data address to find the corresponding memory block directly. Therefore, the value of the TOS register 505 is "3", i.e. it points to the memory cell whose index number is "3" in storage 503. The unit storages a block number "3", so it points to the memory block 517. Due to the continuity of addresses of the data stored in stack cache, based on the method above, in the block address register 527 of memory block 517, the high address 603 is hexadecimal value "FD", and the block number 605 is binary value "11". The BOS pointer points to memory block 511, whose block address register 521 contains high address 603 as hexadecimal value "FE" and block number 605 as binary value "00".

With the execution of the program, the TOS value is updated to hexadecimal address "FD53" (i.e. high address 603 as hexadecimal "FD", block number 605 as binary "01", line number 607 as binary "010" and offset address 609 as binary "011"). Based on the method described above, under the control of the TOS update signal 571, the higher part of the original TOS value in register 509 ("FD" and "11") is written into the register 519, and the higher part of the new TOS value ("FD" and "01") is written into the register 509. The comparator 529 finds that the value of register 509 is smaller than the value of register 519. So in the next clock cycle, incrementor/decrementer 539 subtracts "1" from the value in register 519, obtaining a higher address "FD" and block number "10", which is written back to register 519 via bus 581. Meanwhile, incrementor/decrementer 507 subtracts "1" from the value of TOS register 505 ("3"), obtaining a value "2", and writes it back into TOS register 505, thus making the present TOS pointer point to the memory cell whose index is "2" in storage 503. This memory cell stores a block number "2", which is read by bus 585 and points to the memory block 515. The new value on bus 581 ("FD" and "10") is written to the block address register 525 of the memory block 515.

Thereafter, comparator 529 finds that the value of register 509 is still less than that of register 519. So incrementor/decrementer 539 subtracts "1" from register 519 again, obtaining a high address "FD" and block number "01", and writes it back to register 539 subtracts "1" from register 519 again, obtaining a high address "FD" and block number "01", and writes it back to register 519. Meanwhile, incrementor/decrementer 507 subtracts "1" from the value of TOS register 505 ("2"), obtaining a value "1", and writes it back into TOS register 505, thus making the present TOS pointer points to the memory cell whose index is "1" in storage 503. This memory cell stores a block number "1", which points to the memory block 513. The new value on bus 581 ("FD" and "01") is written to the block address register 523 of the memory block 513. At this time, the distance between TOS pointer and BOS pointer is equal to or less than the minimum reserve distance, which triggers the BOS pointer to decrease by '1' and wrap around, pointing to memory block 517. Based on the method described in the embodiment mentioned above, the move down of the TOS pointer makes the data in memory block 511 stored into a lower level stack cache or the memory, and set invalid to the corresponding address register 521 of memory block 511, making the memory block 511 a new reserved part.

After that, comparator 529 finds that the value of register 509 and the value of register 519 are the same, which means that the corresponding update has been completed. At this time, the value of TOS register 505 is "1", and the index "1" memory cell of the storage 503 has a content of block number "1". So the TOS pointer points to the memory block 513 with block number "1". In the block address register 523 of memory block 513, the high address 603 is hexadecimal "FD", and the block number 605 is binary "01". In the block address register 525 of memory block 515, the high address 603 is hexadecimal "FD", and the block number 605 is binary "10". The BOS pointer points to memory block 517, in its block address register 527, the high address 603 is hexadecimal "FD", and the block number 605 is binary "11". And memory block 511 is the reserved part. To this point, based on the new TOS provided by the processor core 501, the circular buffer maintenance part 541 has added two memory blocks to the stack of this cache level above the original TOS, and has moved a memory block from the BOS of this level to the lower level cache. The circular buffer maintenance part 541 has also stored the corresponding address into each address register of each memory block, to be ready for the access of the processor core 501.

When the processor core 501 accesses the stack by data address 577, which is located at the newly added portion of the stack address, the high address 603 and 605 on 577 are sent to comparators 531, 533, 535, and 537 to be compared with the corresponding higher address in address registers 521, 523, 535, and 527. The comparator, which matches 603 and 605, enables its corresponding line and column decoder to decode the line number 607 and the offset address 609 of the low address on bus 577. Thus, the data location is found for the access of the core 501.

Afterwards, with the execution of the program, the TOS value is updated again to hexadecimal address "FDE6" (i.e. high address 603 as hexadecimal "FD", block number 605 as binary "11", address "FDE6" (i.e. high address 603 as hexadecimal "FD", block number 605 as binary "11", line number 607 as binary "100" and offset address 609 as binary "110"). Based on the method described above, under the control of the TOS update signal 571, the higher part of the original TOS value in register 509 ("FD" and "01") is written into the register 519, and the higher part of the new TOS value ("FD" and "11") is written into the register 509. The comparator 529 finds that the value of register 509 is greater than the value in register 519. So in the next clock cycle, incrementor/decrementer 539 adds "1" to register 519, obtaining a high address "FD" and block number "10", which is written back to register 519. Meanwhile, incrementor/decrementer 507 adds "1" to the value of TOS register 505 ("1"), obtaining a value "2", and writes it back into TOS register 505, thus making the present TOS pointer point to the memory cell whose index is "2" in storage 503.

Thereafter, comparator 529 finds that the value of register 509 is still greater than that of register 519. So incrementor/decrementer 539 adds "1" to register 519 again, obtaining a high address "FD" and block number "11", and writes it back to register 519. Meanwhile, incrementor/decrementer 507 adds "1" to the value of TOS register 505 ("2"), obtaining a value "3", and writes it back into TOS register 505, thus making the present TOS pointer point to the memory cell whose index is "3" in storage 503. This memory cell stores a block number "3", which points to the memory block 517. At this time, the distance between TOS pointer and BOS pointer is equal to or smaller than the minimum distance of stack, and the BOS pointer moves upward and points wrap around the number '3' unit of storage 503 to the number '0' unit of storage 503. Based on the trigger mentioned above, the move upward of the BOS pointer makes the data in lower level cache retrieved back to the memory block 511, which is pointed by number '0' memory cell. And correspondingly, use the value 'FE00' (obtained by original BOS pointer value 'FD11' minus '1') to update the block address register 521. The original BOS pointer value can be obtained either from register 519 or from independent BOS address register, which updates at BOS pointer's every move and stores the corresponding address.

After that, comparator 529 finds that the value of register 509 and the value of register 519 are the same, which means that the corresponding update has been completed. At this time, the value of TOS register 505 is "3", and the index "3" memory cell of the storage 503 has a content of block number "3". So the TOS pointer points to the memory block 517 with block number "3". In the block address register 527 of memory block 517, the high address 603 is hexadecimal "FD", and the block number 605 is binary "11". In the block address register 521 of memory block 511, the high address 603 is hexadecimal "FE", and the block number 605 is binary "00". In the block address register 523 of memory block 513, the high address 603 is hexadecimal "FE", and the block number 605 is binary "01". The memory block 515 is the reserved part. In this scheme, the circular buffer maintenance part 541 takes charge to maintain the stack based on the change of TOS value and stores the address in the corresponding memory block. The core 501 accesses the stack through comparing the storage access memory address 577 with the addresses stored in the registers of memory block of 543 directly.

Figure 7:
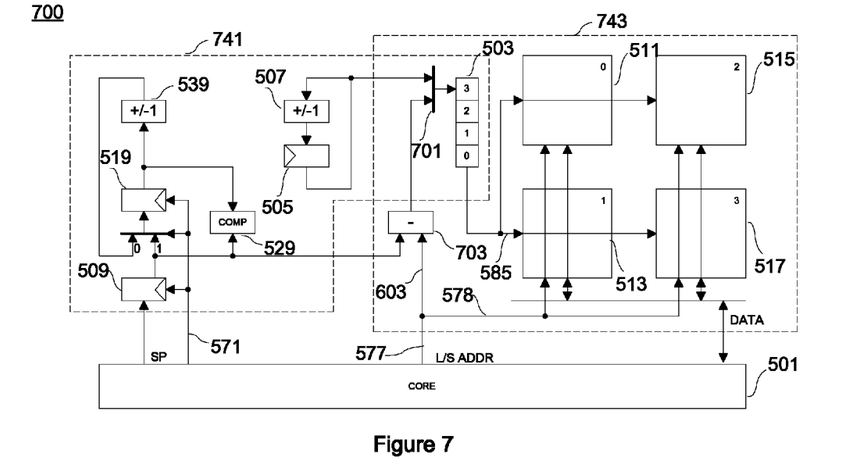
FIG. 7 illustrates another exemplary block stack cache consistent with the disclosed embodiments.

In this disclosure, one can further improve the data read-write part 543 of stack cache 103. FIG. 7 illustrates another exemplary block stack cache consistent with the disclosed embodiments. In this embodiment, the circular buffer maintenance part 741 is similar to that of FIG. 5. The difference is that the output of the TOS register 505 needs to be selected by selector 701 and then sent to storage 503, and the parts used by data read-write part 743 includes storage 503, memory blocks 511, 513, 515, 517 and subtractor 703. The output of subtractor 703 is also selected by selector 701 and then sent to storage 503.

In this embodiment, the operation of the circular buffer maintenance part 741 is similar to that of FIG. 5. The difference is when the TOS value changes, which causes a change of the value of TOS register 505, selector 701 selects the output from TOS register 505 as an index to send to storage 503 and then read the memory block number stored in the corresponding line. In addition, in the process of moving the TOS pointer, it doesn't need to calculate the block address of every memory block like in the embodiment in FIG. 5.

In the data read-write part 743, when performing a data access, the subtractor 703 use the high address 603 and the block number 605 of the data address 577, which is sent by processor core 501, subtracts the high address 603 and the block number 605 from register 509, and then sends the resulting difference to the selector 701. After selection, it is used as an index number to read the content from storage 503, which is the memory block number corresponding to address on 577. Then, based on the line number 607 and the offset address 609 of the data address 577, the data could be located in the memory block, which corresponds to the block number. In this way we can save the block address register in the embodiment of FIG. 5 and avoid the comparison of the block addresses, thus simplifying the hardware and reducing power dissipation.

Figure 8:
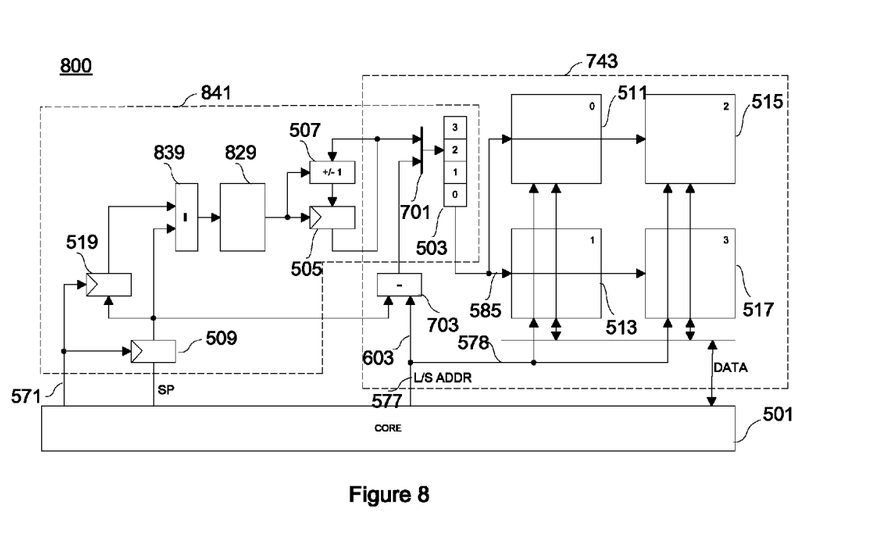
FIG. 8 illustrates another exemplary block stack cache consistent with the disclosed embodiments.

Based on the present invention, the circular buffer maintenance section 641 in stack cache 103 can be further improved. FIG. 8 illustrates another exemplary block stack cache consistent with the disclosed embodiments. Data reading/writing section 643 in the embodiment is identical to that illustrated in FIG. 6. Components utilized by Data reading/writing section 841 include registers 509, 519, TOS (Top-of-stack) register 505, incrementor/decrementer 507, subtractor 839 and controller 829, wherein register 509, 519, TOS register 505, incrementor/decrementer 507 are identical to those illustrated in FIG. 7.

In data read/write section 841, when the top of the stack is modified, controlled by TOS update signal 571, the new value of top of the stack is written to register 509 while the old value of top of the stack previously stored in register 509 is written to register 519. Subtractor 839 then subtracts the value of register 509 from register 519, and sends to Controller 829 the difference between the two registers, which indicates the difference between the old and the new value of TOS. The sign of the difference (positive, negative or zero) indicates the direction in which TOS pointer is moved (where a positive value indicates a downward movement of the pointer, namely pushing, a negative value indicates an upward movement, namely popping and a zero indicates non-movement). The absolute value of the difference indicates the number of memory blocks TOS pointer has passed through.

Controller 829 updates the TOS register 505 based on the difference received as described above. Specifically, the difference, denoted with positive integer 'n', indicates that TOS pointer has moved downward by n memory blocks. Incrementor/decrementer 507 subtracts '1' from TOS register 505 each time, such that TOS pointer in TOS register 505 points to the next position in register 503. The decrement operation is performed n times until eventually the block number of the memory block corresponding to value in register 509 is stored in the memory unit of memory 503 addressed by TOS pointer in TOS register 505.

Similarly, if the difference described above is denoted with '−m' where m is a positive integer, indicating that the TOS pointer has moved upward by m memory blocks, incrementor/decrementer 507 add '1' to TOS register 505 modularly each time, such that TOS pointer in TOS register 505 points to the one position up in memory 503. The increment operation is performed m times until eventually the block number of the memory block corresponding to value in register 509 is stored in the memory unit of memory 503 addressed by TOS pointer in TOS register 505.

In this embodiment, the maintenance of circular buffer is similar to that illustrated in FIG. 5 while the behavior of data read/write section 743 is identical to that in the embodiment illustrated in FIG. 7, which are therefore not repeated here. Thus, the functions of the embodiment illustrated in FIG. 7 are implemented with simplified structure.

Figure 9:
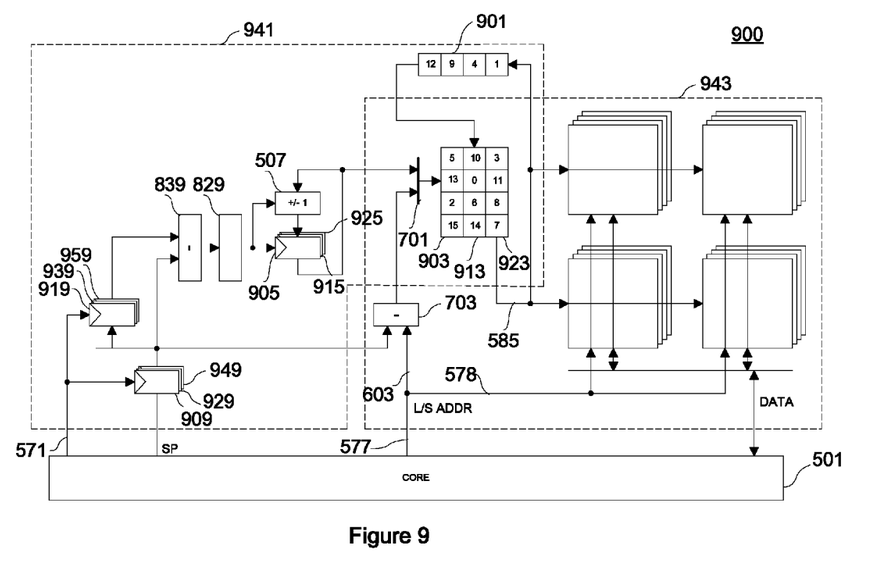
FIG. 9 illustrates an exemplary multi-thread stack cache consistent with the disclosed embodiments.

The structure of stack cache described in the present invention also supports multi-threading. In this case, every thread has its own set of register 509, 519, memory 503, TOS register 505 and several memory blocks, each thread has its own maintenance of circular buffers and data reading/writing capability respectively. FIG. 9 illustrates an exemplary multi-thread stack cache consistent with the disclosed embodiments. The embodiment provides an instance with 3 threads, where subtractor 839, controller 829, incrementor/decrementer 507, subtractor 703, reserve pool 901 and several memory blocks are shared among the threads. These components, except reserve pool 901 and the memory blocks described above, are identical to those in the embodiment illustrated in FIG. 8. Corresponding register 909, 919, TOS register 905 and memory 903 are private to thread 1; Corresponding register 929, 939, TOS register 915 and memory 913 are private to thread 2; Corresponding register 949, 959, TOS register 925 and memory 923 are private to thread 3. Among the components described above, register 909, 929 and 949, equal in functions with register 509 in the embodiment illustrated in FIG. 8, store the upper bits and block numbers of current TOS addresses; register 919, 939 and 959, equal in functions with register 519 in the embodiment illustrated in FIG. 8, store the upper bits and block numbers of previous TOS addresses; memory 903, 913 and 923, equal in functions with memory 503 in the embodiment illustrated in FIG. 8, store the block numbers of the memory blocks used by each thread in order of address; TOS register 905, 915 and 925, equal in functions with the TOS register 505 in the embodiment illustrated in FIG. 8, store the index to corresponding registers (i.e. register 903, 913 or 923) for reading the number of the memory block pointed to by the TOS pointer of each threads.

In the present embodiment, the block number of the memory blocks occupied by data are stored in memory 903, 913 or 923, while the block number of the memory blocks reserved are stored in reserve pool 901. FIG. 9 illustrated that, with 16 memory blocks in all, data in the stack section of thread 1 is stored in memory block 5, 13, 2 and 15, data in the stack section of thread 2 is stored in memory block 10, 0, 6 and 14, while data in the stack section of thread 3 is stored in memory block 3, 11, 8 and 7. In addition, the block numbers of memory block 12, 9, 4 and 1, are not yet used, are therefore stored in reserve pool 901.

Therefore, the stack cache in the embodiment illustrated in FIG. 8 may comprise the private components selected based on the currently running thread and the shared components. On push stack operation, as long as there are unused memory block numbers in reserve pool 901, the memory blocks can be used by the new data address, while the block number is written to the corresponding memories (i.e. memory 903, 913 or 923) and then the corresponding TOS register (i.e. TOS register 905, 915 or 925) is updated. Pop stack operation can be done simply by returning the block number addressed by TOS pointer from corresponding memories (i.e. memory 903, 913 or 923) to reserve pool 901, and updating the value in corresponding TOS registers (i.e. TOS register 905, 915 or 925). When the CPU core outputs data address 577 for data access, by methods described in the previous embodiment, the result from subtractor 703 is sent to selector 701 and is used as index to find the specific memory block in the content read from memory 503. The data requested is then retrieved from the memory block based on line number 607 and address offset 609 in data address 577.

When the TOS pointer of a thread moves downward during stack operation and therefore requires more memory blocks, it is possible that reserve pool 901 has run out of reserved memory blocks. Besides releasing memory blocks for TOS pointer by moving the bottom-of-stack pointer of the current thread (i.e. moving the memory blocks pointed to by the bottom-of-stack pointer into lower-level memory), memory blocks can also be released for the use of current thread by moving the bottom-of-stack pointer of other threads.

In addition, the embodiment illustrated in FIG. 9 can be extended to the case of running multiple virtual machines, each having one or more threads. In this case, each independent thread has its private components. For example, p virtual machines, each having q threads, will need (p*q) sets of private components. When one of the threads is running, the stack cache structure of the present invention can comprise the private components of the thread and the shared components, applying the method identical to that described in the embodiment above, which is not repeated here.

Figure 10:
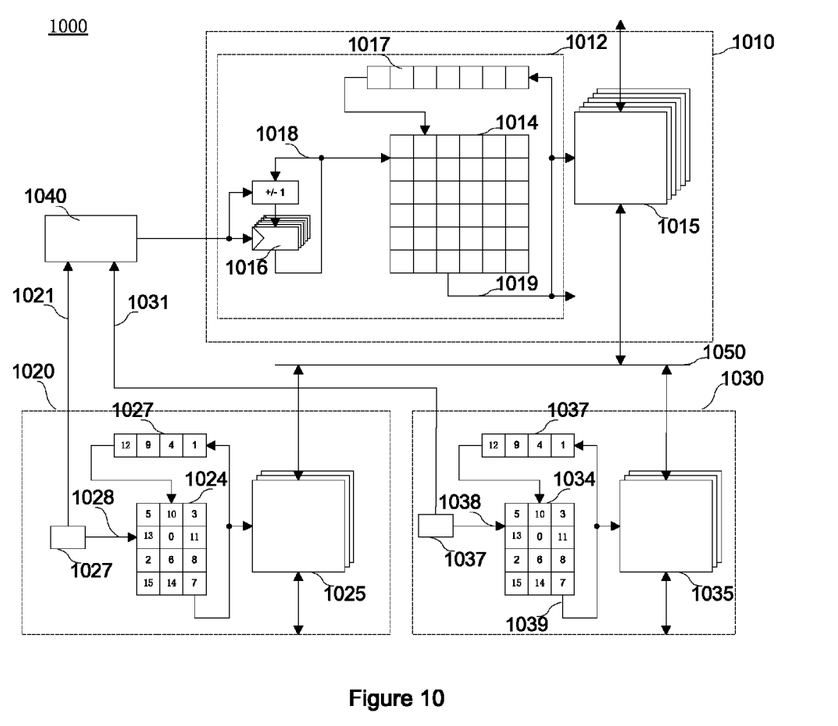
FIG. 10 illustrates an exemplary multi-level stack cache consistent with the disclosed embodiments.

FIG. 10 illustrates an exemplary multi-level stack cache consistent with the disclosed embodiments. Wherein, controller 1012 in low-level cache 1010 has multiple sets of memory 1014 (similar to the memory illustrated in FIG. 9)

and the corresponding counter register 1016, each corresponding to a thread or a virtual machine. The output 1019 of memory 1014 is the block number of low-level memory, pointing to a low-level memory block in low-level memory 1015. Controller 1012 has another reserve pool 1017. The structure of high-level cache 1020 and 1030 is illustrated in FIG. 9, wherein, 1024 and 1034 is their respective memories; 1025, 1035 is their respective high-level memories; 1027 and 1037 is their respective reserve pools. TOS pointer 1018 of the circular buffer in the low-level cache is adjacent to TOS pointer 1028 or 1038 of the circular buffer in the high-level cache, and moves in the same direction with the latter two. This adjacency is defined as the lower level data block in memory 1015 pointed by the address bus 1019 is one higher in sequential order to the data block in higher level stack memory pointed by bus 1029 or 1039. Where the lower level cache circular buffer TOS pointer 1018 indexes memory 1014 to output its content on bus 1019. Where the higher level cache circular buffer TOS pointers 1028 or 1038 index memories 1024 or 1035 to output their contents on buses 1029, 1039.

When the bottom-of-stack pointer 1028 in the controller of high-level cache 1020 decreases by '1' (i.e. moves towards the top-of-stack pointer by one data block) in order to evacuate the data block for storing the data produced by the growing top-of-stack, the evacuated high-level data block is moved to low-level memory 1010. The decrement operation of bottom-of-stack pointer 1028 is sent to controller 1012 in the low-level cache through arbiter 1040. After thread tag matching, a corresponding column in the memory 1014 and a corresponding register in counter register 1016 are selected by controller 1012. The pointer 1018 in the counter register decreases by '1' correspondingly, pointing to the memory cell one cell lower than the cell which pointer 1018 previously pointed to. Since there is no valid block number of low-level data block in the cell, reserve pool 1017 fills the cell with the block number of the first unassigned low-level data block. The cell addressed by the decreased pointer 1018 now points the lower level memory block corresponding to the cell content for storing the data block evacuated from higher level cache.

When the bottom-of-stack pointer 1038 in the controller of high-level cache 1030 increases by '1' (i.e. moves towards the bottom of the stack pointer by one data block), a low-level data block is read from low-level cache 1010 and moved to high-level memory 1030. The increment operation of bottom-of-stack pointer 1038 is sent to controller 1012 in the low-level cache through arbiter 1040. After thread tag matching, a corresponding column in the memory 1014 and a corresponding register in counter register 1016 are selected by controller 1012. Pointer 1018 of the counter register increases by '1' accordingly, pointing to the memory one cell higher than the cell that pointer 1018 previously pointed to in the selected column in memory 1014. The cell content of the cell pointed to by the increased pointer 1018 is outputted via address bus 1019 to address the corresponding the lower-level data block. The lower level data block, fills in a high-level data block addressed by bus 1039 carrying the content of the memory cell addressed by the pointer 1038 after an increment by '1'. The content of the cell is already in the cell, or, if the unit is previously void of valid block number of any data block, high-level reserve pool 1037 would assign a valid block number to it. After completing data movement, controller 1012 moves the low-level data block number in the cell addressed by pointer 1018 in memory 1014 before its increment operation into low-level reserve pool 1017 for subsequent call, and sets the cell to invalid.

Arbiter 1040 arbitrates between requests from multiple threads of multiple high-level memories, and transmits the requests to low-level memory controller 1012 based on the sequence of requests and arbitration rules. High-level memory 1020 and 1030 move data between different levels of memories after receiving the response from low-level memory controller 1012. Low-level memory block is not necessarily the same in size with high-level memory block. For example, the size of low-level data block can be 4 times as big as high-level data block's. In that case, when the bottom-of-stack pointer in high-level memory moves from one high-level memory block to an adjacent one, the bottom-of-stack pointer in the low-level memory moves to the adjacent ¼ low-level memory block.

In the embodiment illustrated in FIGS. 5, 7, 8 and 9, it is assumed that the top-of-stack moves towards a new value on push operation, and the CPU core will access the data between the new top-of-stack and the previous top-of-stack (i.e. CPU core will only access the data between the current TOS and previous TOS when accessing stack section). The value of TOS is lower than bottom-of-stack pointer before push stack operation (i.e. the CPU core will only access the data in the first level cache). Now consider the case when the movement of the bottom-of-stack pointer leads to that the values of top-of-stack pointer (e.g. register 519 in FIG. 5) is greater than that of bottom-of-stack pointer (i.e. the CPU core may access the data stored in second level cache). Due to the consistency of data address, the data can be addressed in the second-level cache through calculation.

Specifically, suppose the size of the first level stack cache and second level stack cache are the same, then subtract the higher bit portion 603 of the first level cache's top-of-stack value (such as the value of register 509) from the higher bit portion 603 of the data address of the data, and then subtract the number of valid data memory blocks in the first level cache from the difference (that is the number of memory blocks between the data location and the top-of-stack of the first level cache), the result is the number of memory blocks between the data location and the top of the second level stack cache. Based on this result and the second level TOS pointer value, the line number 607 and offset address 609 in the data address finds this data from second level cache. For the case of the first level stack cache block size differs from that of the second level stack cache block, a similar method can be used.

Or, an additional subtractor can be used, directly subtract the higher bit portion 603 of the TOS of the second level stack cache from the higher bit portion 603 of the data's data address, and obtain the number of memory blocks between the data location and the top of the second level stack cache, and thus find the data in the second level cache. For the case of the data being located in a lower level cache, a similar method can be used.

Figure 11:
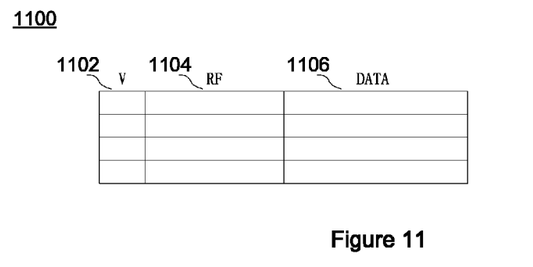
FIG. 11 illustrates an exemplary data reading storing bypasser consistent with the disclosed embodiments.

FIG. 11 illustrates an exemplary data reading storing bypasser 1100 consistent with the disclosed embodiments. 1100 is a data storing and address comparing structure. It has a plural number of storage rows, each row has fields that store and retrieve a read valid signal 1102, register number 1104 and data 1106. 1104 also has a comparator which compares the source register file number of the data store instruction and the destination register file number of other instructions.

The format of load instruction is LW V1 23 (V0), which means the content of register V0 in register file is used as base value, offset value 23 is added to the base value, and data is read from memory and stored in register V1 in register file. At the same time, this embodiment also synchronously stores the data into field 1106 on an invalid row (read valid field 1102 is 'invalid') in data reading storing bypasser 1100. Then write the target register number V1 into the same rows register number field 1104, and set the row's read valid signal 1102 as 'valid'.

If the format for data store instruction is SW V1 88 (SP), it means store V1 register's contents into the memory location pointed by the address which is the sum of register file's SP register's contents (base address) and offset amount 88. At this time, V1 source register in this store instruction is sent to the rows of data reading storing bypasser 1100 which are valid (fields 1102 are 'valid') and matched with the register file number stored in their fields 1104. If match is successful, store the data from the successfully matched row into the memory address indicated by the store instruction, and set the read valid signal 1102 as invalid, and stop reading register V1 in register file. If in there is no match in the data reading storing bypasser, then read data from V1 register in register file (RF) and store it to memory based on the store address.

When the register in register file is updated by an instruction, the target register address of the instruction is also sent to 1104 fields for matching. If match is successful, it indicates at this time the data in the data field of data reading storing bypasser 1100 of the matched row is not the latest, thus the read valid bit 1102 of the matched row is set 'invalid'.

The above example shows the moving of data from non-stack data memory to stack memory. Moving data from stack to non-stack, from non-stack to non-stack, from stack to stack, can also use data reading storing bypasser 1100. Data reading storing bypasser 1100 helps complete data movement faster, reduces time and power consumption.

The invention claimed is:

1. A cache method, comprising dividing a cache into:
   a stack cache, used by data that is stored into a stack region during program runtime; and
   a non-stack cache, used by other data that is stored during program runtime;
   when the data executed by processor core accesses the corresponding data located in the stack region, the processor core directly accesses the stack cache,
   wherein the cache further comprises:
   a top-of-stack pointer, pointing to the data located at top of the stack in the stack cache; and
   a bottom-of-stack pointer, the bottom-of-stack pointer and top-of-stack pointer maintaining a certain distance, the data between which is the effective data within the stack cache;
   wherein:
   the cache is further divided into multi-level stack caches;
   the top-of-stack pointer value of a highest level stack cache is determined by the top-of-stack value produced by the processor core; and
   the top-of-stack pointer values of other level stack caches is determined by the bottom-of-stack pointer of the stack cache one level higher.

2. The method according to claim 1, wherein, based on the data access instruction's data address determine if the corresponding data is located within the stack region, or within the non-stack region; or based on the base address register number of the data access instruction determine if the corresponding data is located within the stack region, or within the non-stack region.

3. The method according to claim 2, wherein, the data addresses greater than or equal to the value of the base address register are located within the stack region.

4. The method according to claim 2, further comprising using a memory space with contiguous address in the stack cache to store the data of contiguous memory address in the stack region of memory space.

5. The method according to claim 4, wherein, a circular buffer is used to implement the stack cache.

6. The method according to claim 5, wherein, every storage unit or every group of storage units has a corresponding data address; simultaneously match the corresponding data addresses of the storage units and a data address sent by the processor core, a storage unit corresponding to the data address sent by the processor core can be found, or a group of storage units can find a corresponding storage unit in the current group of storage units.

7. The method according to claim 5, wherein, the top-of-stack value and the number of the corresponding storage unit or a group of storage units;
   subtract the data address sent by the processor core with the top-of-stack value, and obtain the difference between the data address and the top-of-stack value;
   based on the difference and the contiguous address sequence, finds the corresponding memory cell or a corresponding memory cell from a set of memory cells from the stack cache.

8. The method according to claim 1, wherein, when the top-of-stack value changes, the direction in which the top-of-stack pointer moves can be determined by subtracting the original top-of-stack pointer value and the new top-of-stack pointer value.

9. The method according to claim 1, wherein, the circular buffers of the stack caches of all levels form a big circular buffer, the circular buffer spans different cache levels.

10. The method according to claim 1, wherein, when the stack cache of a higher level is full or almost full, store at least one data the bottom-of-stack pointer points to into a lower level stack cache and the storage location of the valid data that has yet to be stored that neighbors the location of the top-of-stack pointer, and correspondingly move the bottom-of-stack pointer of the higher level stack cache and the top-of-stack pointer of the lower level stack cache.

11. The method according to claim 10, wherein, when the stack cache of a higher level is empty or almost empty, and there is data in a lower level stack cache, retrieve at least one data pointed to by the top-of-stack pointer of the lower level stack cache and store it into the location of valid data not yet stored that neighbor the bottom-of-stack pointer of the higher level stack cache, and correspondingly move the bottom-of-stack pointer of the higher level stack cache and the top-of-stack pointer of the lower level stack cache.

12. The method according to claim 11, wherein, a certain number of storage units in the stack cache are reserved as a reserved section;
   new data can be written into the reserved section of the stack cache, but the reserved section must be greater than or equal to the preset minimum capacity; the minimum capacity value is zero or positive;
   if the writing in of new data results in the reserved section becoming less than the minimum capacity, the bottom-of-stack pointer points to at least one data stored in a lower level stack cache and the storage location of valid data that has not yet been stored that neighbor the top-of-stack pointer location, and correspondingly move the bottom-of-stack pointer of the stack cache and the top-of-stack pointer of the lower level stack cache.

13. The method according to claim 12, wherein, when supporting the simultaneous execution of multiple threads, the number of the storage unit corresponding to the reserved section is stored in the reserve pool;
if new data is written in, the reserve pool allocates a storage unit number to store the data;
if there is data retrieved from the stack and the data is no longer stored there, the corresponding storage unit number is sent back to the reserve pool.

14. The method according to claim 13, wherein, when the top-of-stack pointer of a thread that is currently being executed by the stack, moves down and needs more storage blocks, and the reserve pool has no more reserved memory blocks, control other threads to move the bottom-of-stack pointer to release memory blocks for the thread top-of-stack pointer to use.

15. A cache system, comprising a stack cache and a non-stack cache;
wherein the stack cache only stores data that is in the stack region during program execution;
when the data corresponding to the processor core's data access command is located in the stack region, the processor core directly access the stack cache,
wherein the cache system further comprises:
a top-of-stack pointer, pointing to the data located at top of the stack in the stack cache; and
a bottom-of-stack pointer, the bottom-of-stack pointer and top-of-stack pointer maintaining a certain distance, the data between which is the effective data within the stack cache;
wherein:
the cache system further includes multi-level stack caches;
the top-of-stack pointer value of a highest level stack cache is determined by the top-of-stack value produced by the processor core; and
the top-of-stack pointer values of other level stack caches is determined by the bottom-of-stack pointer of the stack cache one level higher.

16. The system according to claim 15, wherein, the processor core uses a memory space with contiguous address in the stack cache to store the data of contiguous memory address in the stack region of memory space.

17. The system according to claim 16, wherein, the stack cache is comprised of circular buffers.

18. The system according to claim 17, wherein, every memory unit or every group of memory units also includes:
address register, used to store a data address of a memory unit or a group of memory units; and
comparator, used to compare the data address of the memory unit or a group of memory units with a data address sent by the processor core;
through the simultaneous matching of the comparator, the storage unit corresponding to the data address sent by the processor core can be found, or the storage unit corresponding to the group of memory cells can be found in the group of storage units.

19. The system according to claim 17, further including:
a top-of-stack register, used to record top-of-stack value;
a top-of-stack pointer register, used to record the memory cell corresponding to the top-of-stack value or the number of a group of memory cells; and
an address subtract; used to subtract the data address sent by the processor core with the top-of-stack value, and obtain the difference between the data address and top-of-stack value;
based on the difference and the contiguous address sequence, finds the corresponding memory cell or a corresponding memory cell from a set of memory cells from the stack cache.

20. The system according to claim 15, further including a subtractor, when the top-of-stack pointer value changes, the direction of movement of the top-of-stack pointer can be determined by using the subtractor to subtract the original top-of-stack pointer value and the new top-of-stack pointer value.

21. The system according to claim 15, wherein, when a higher level stack cache is full or almost full, store at least one data that bottom-of-stack pointer points to, into an memory location that is not storing valid data next to the top-of-stack pointer location in the lower level stack cache, and move the bottom-of-stack pointer of the higher level stack cache and the top-of-stack pointer of the lower level stack cache accordingly.

22. The system according to claim 21, wherein, when the higher level stack cache is empty or near empty, and when a lower level stack cache has data, store the data the lower level stack cache's top-of-stack pointer points to, into a memory location that is not storing valid data next to the bottom-of-stack pointer of the higher level stack cache, and move the bottom-of-stack pointer of the higher level stack cache and the top-of-stack pointer of the lower level stack cache accordingly.

23. The system according to claim 22, wherein, multiple memory units are reserved as the reserved portion;
the new data can be written into the stack cache's reserved portion, but must ensure that the reserved portion is greater than or equal to the defined minimum capacity; the minimum capacity value is zero or positive;
if a new write-in results in the reserved portion becoming less than the defined minimum capacity, move at least one data that the bottom-of-stack pointer points to into a memory unit that is not storing valid data and neighbors the top-of-stack pointer in a lower level stack cache, and move the bottom-of-stack pointer of the stack cache and the top-of-stack pointer of the lower level stack cache accordingly.

24. The system according to claim 23, further including a reserve pool; when supporting multiple threads executing in parallel, store the number of the storage unit corresponding to the reserved portion into the reserve pool;
if there is a new data write-in, reserve pool assigns a storage unit number to store data;
if there is data that is fetched from the stack and no longer stored, the corresponding memory unit number is sent back to the reserve pool.

* * * * *